United States Patent
Ketchantang et al.

(10) Patent No.: US 9,460,335 B2
(45) Date of Patent: Oct. 4, 2016

(54) METHOD FOR DETECTING THE REALITY OF VENOUS NETWORKS FOR THE PURPOSES OF IDENTIFYING INDIVIDUALS, AND BIOMETRIC RECOGNITION METHOD

(71) Applicant: MORPHO, Issy-les-Moulineaux (FR)

(72) Inventors: William Ketchantang, Issy-les-Moulineaux (FR); Sylvaine Picard, Issy-les-Moulineaux (FR)

(73) Assignee: MORPHO, Issy les Mouliveaux (FR)

( * ) Notice: Subject to any disclaimer, the term of this patent is extended or adjusted under 35 U.S.C. 154(b) by 0 days.

(21) Appl. No.: 14/431,547

(22) PCT Filed: Sep. 27, 2013

(86) PCT No.: PCT/EP2013/070272
§ 371 (c)(1),
(2) Date: Mar. 26, 2015

(87) PCT Pub. No.: WO2014/049149
PCT Pub. Date: Apr. 3, 2014

(65) Prior Publication Data
US 2015/0261993 A1    Sep. 17, 2015

(30) Foreign Application Priority Data
Sep. 28, 2012    (FR) ..................... 12 59239

(51) Int. Cl.
G06K 9/00    (2006.01)
G06K 7/12    (2006.01)
H04N 5/33    (2006.01)

(52) U.S. Cl.
CPC ............ *G06K 9/00114* (2013.01); *G06K 7/12* (2013.01); *H04N 5/33* (2013.01); *G06K 2009/00932* (2013.01)

(58) Field of Classification Search
CPC ............... G06K 9/00; G06K 9/00026; G06K 9/00885; G06K 9/00906; G06K 9/036; G06K 2209/05
USPC ......................................... 382/124
See application file for complete search history.

(56) References Cited

U.S. PATENT DOCUMENTS

2007/0230753 A1* 10/2007 Kitane ............... G06K 9/00006
382/124
2009/0208070 A1* 8/2009 Fourre ............... G06K 9/00033
382/124

(Continued)

OTHER PUBLICATIONS

Fan et al., "Biometric Verification Using Thermal Images of Palm-Dorsa Vein Patterns," *IEEE Transactions on Circuits and Systems for Video Technology*, vol. 14, No. 2, Feb. 1, 2004, pp. 199-213.
Lin et al., "Palmprint verification using hierarchical decomposition," *Pattern Recognition*, vol. 38, No. 12, Dec. 1, 2005, pp. 2639-2652.

(Continued)

*Primary Examiner* — Stephen R Koziol
*Assistant Examiner* — Shaghayegh Azima
(74) *Attorney, Agent, or Firm* — Muncy, Geissler, Olds & Lowe, P.C.

(57) ABSTRACT

A method of detecting a venous network in a portion of a human body, the method comprising the steps of capturing an infrared image of said human body portion in order to reveal a venous network of said human body portion; analyzing contrast in the infrared image in order to determine contrast characteristics of the infrared image; and determining whether the human body portion is real on the basis of contrast characteristics determined in the infrared image and of contrast characteristics determined from reference human body portions. A method of biometric recognition with a prior stage of detecting whether a portion of a human body is real.

9 Claims, 1 Drawing Sheet

(56) References Cited

U.S. PATENT DOCUMENTS

| | | | | |
|---|---|---|---|---|
| 2009/0220141 | A1* | 9/2009 | Aoki | G06T 5/009 |
| | | | | 382/134 |
| 2009/0232367 | A1* | 9/2009 | Shinzaki | G06K 9/0012 |
| | | | | 382/124 |
| 2010/0097179 | A1* | 4/2010 | Hayashida | G07C 9/00158 |
| | | | | 340/5.82 |
| 2010/0110170 | A1* | 5/2010 | Bringer | G06K 9/00046 |
| | | | | 348/77 |
| 2011/0129128 | A1* | 6/2011 | Makimoto | G06K 9/00013 |
| | | | | 382/124 |
| 2012/0263357 | A1* | 10/2012 | Xu | G06K 9/00013 |
| | | | | 382/128 |
| 2015/0163220 | A1* | 6/2015 | Gaston | G06Q 20/341 |
| | | | | 726/5 |

OTHER PUBLICATIONS

Xiangqian et al., "Fuzzy directional element energy feature (FDEEF) based palmprint identification," Pattern Recognition, 2002, Proceedings 16th Int'l. Conference onQuebec City, Que., Canada Aug. 11-15, 2002, *IEEE Comput. Soc.*, US. vol. 1, Aug. 11, 2002, pp. 95-98.

Mistani et al., "Multispectral Palmprint Recognition Using a Hybrid Feature," arXiv.org., URL: http://arvix.org/pdf/1112.5997v1.pdf, Dec. 27, 2011, pp. 1-7.

Kim, "Palmprint Verification Using Multi-scale Gradient Orientation Maps," *Journal of the Optical Society of Korea*, vol. 15, No. 1, Mar. 25, 2011, pp. 15-21.

Goh et al., "A Contactless Biometric System Using Palm Print and Palm Vein Features," *Advanced Biometric Technologies*, Aug. 9, 2011, 26 pages.

* cited by examiner

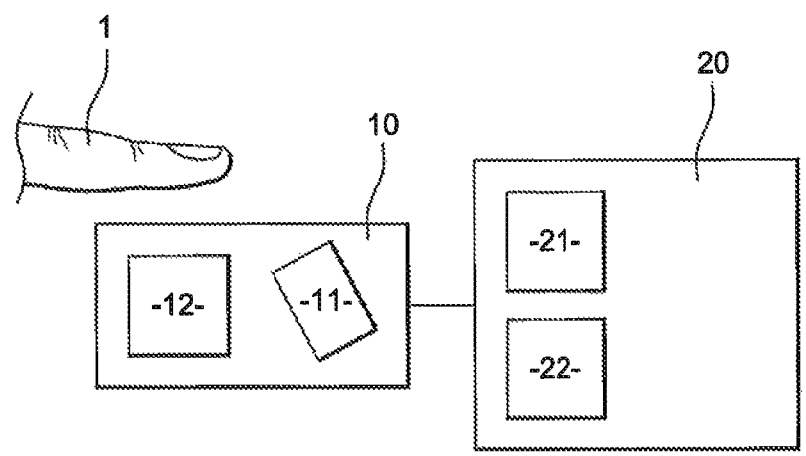

METHOD FOR DETECTING THE REALITY OF VENOUS NETWORKS FOR THE PURPOSES OF IDENTIFYING INDIVIDUALS, AND BIOMETRIC RECOGNITION METHOD

BACKGROUND OF THE INVENTION

The present invention relates to a method of detecting a venous network from a portion of an individual's body for the purposes of identifying said individual. The invention also relates to a method of biometrically recognizing an individual.

The use of automatic biometric recognition methods is becoming more and more widespread for identifying individuals, e.g. in the context of border controls, controlling access to secure zones such as boarding areas in airports, etc., or controlling access to data.

A biometric recognition method generally comprises the following steps:
  capturing biometric characteristics on a portion of an individual's body;
  comparing the biometric characteristics with stored biometric characteristics; and
  on the basis of the comparison, determining whether the individual is or is not recognized.

A biometric recognition method is performed by means of an automatic biometric recognition system having means for capturing biometric characteristics forming a signature, means for storing biometric characteristics forming signatures, and means for comparing captured biometric characteristics with the stored biometric characteristics. The capture means are often image capture means. The memory or storage means may for example be a memory (an integrated circuit, a bar code, etc.) that is incorporated in a passport in order to store biometric characteristics of the holder of the passport, or a memory of a computer unit containing a database associating the biometric characteristics of individuals with data for identifying those individuals. The comparison means are computer units incorporating calculation means for executing algorithms for processing and comparing biometric characteristics.

The biometric characteristics of the hand, and more particularly of the fingers of individuals are used very often for performing such methods. It is thus known to perform biometric recognition on the basis of fingerprints or on the basis of venous networks of fingers. With venous networks, the capture means are constituted by an image sensor.

In the context of an automatic biometric recognition method, there is no operator present to monitor image capture, such that it is possible for a dishonest person to attempt to fool the system by presenting the capture means with a representation of the biometric characteristics of a registered person, i.e. some other person who has been properly identified and whose biometric characteristics have been stored, in order to enable that other person to be recognized by the system. The representation may be in the form of a fake finger having biometric characteristics, or it may merely be an image of a venous network.

Automatic biometric recognition systems are thus provided with means for detecting that kind of fraud. These means are generally of hardware type and they seek for example to detect such fraud by:
  detecting variation in the flow of blood in the venous network as a function of pressure between the finger and the sensor; or
  interferometrically analyzing a wave diffused by the finger; or indeed
  by studying differences in absorption by the finger of two light beams at different wavelengths.

Those systems require appropriate technical architectures that make them relatively expensive.

It can thus be understood that biometrically identifying an individual assumes that it is possible to solve two distinct types of problem:
  a fraud-detection problem of determining whether the body portion as presented is indeed a portion of a living body; and
  an identification problem of extracting from the body portion a biometric signature for comparison with stored biometric signatures.

If a dishonest person manages to reproduce an artificial biometric signature, that may satisfy the identification problem.

It follows that whether or not the body portion is living cannot be determined solely from a successful comparison of biometric signatures.

Specifically, biometric recognition algorithms are arranged only to extract digital signatures of a medium, regardless of its nature, and to compare them with biometric signatures that have been stored. In contrast, algorithms for detecting fraud are arranged to determine the nature of the medium presented without extracting the biometric signature therefrom. This is because the characteristics that serve to reveal whether the medium is living and the characteristics that make recognition possible are not the same or are not used in the same way.

BRIEF SUMMARY OF THE INVENTION

An object of the invention is to proposes simple means enabling fraud to be detected.

To this end, the invention provides a method of detecting a venous network in a portion of a living human body, the method comprising the following steps:
  capturing an infrared image of said human body portion in order to reveal a venous network of said human body portion;
  analyzing contrast in the infrared image in order to determine contrast characteristics of the infrared image; and
  determining whether the infrared image was captured from a portion of a real human body on the basis of contrast characteristics determined in the infrared image and of contrast characteristics determined from reference human body portions.

It has been found that it is very difficult to make an artificial representation of a venous network for which an infrared image presents during contrast analysis the same characteristics as an image of a venous network captured directly from a portion of a living human body. The contrast analysis of the infrared image of the venous network thus serves to detect frauds. The fraud detection is also effective with infrared images captured at a single wavelength or in a single wavelength range.

In a particular implementation, the method comprises a configuration stage and a detection stage.

The configuration stage comprises the steps of:
  capturing infrared images of human body portions and representations of venous networks;
  isolating blocks of pixels in each image and performing contrast analysis to determine for each block a directional gradient for at least two resolutions of the image;
  determining average energies for the directional gradients; and determining by training average energy thresholds for discriminating between an image of a venous network captured directly from a human body portion and an image of a venous network captured from a representation of a venous network.

The detection stage comprises the steps of:
capturing at least one infrared image of a venous network;
isolating blocks of pixels in the image and performing contrast analysis to determine for each block a directional gradient for at least two resolutions of the image;
determining average energies of the directional gradients; and
comparing these average energies with the thresholds in order to verify that the image of the venous network was captured directly from a human body portion.

This implementation is particularly effective. It is also relatively simple: fraud is detected without taking account of geometrical information (position, orientation) relating to the gradient, but only of the average values of the amplitudes of the gradients. As a result, the comparison is performed on a small amount of data and therefore is not greedy in terms of time and resources. Furthermore, the directional gradients are not compared directly with stored directional gradients associated with particular users: it is the average energies derived from these directional gradients that are used, and they are compared with thresholds. This is more a question of observation than of comparison in the "matching" sense, of the kind commonly used in biometric recognition.

The invention also provides a biometric recognition method comprising a stage of detecting whether a human body portion is real, and a biometric recognition stage, the method comprising the following steps:
capturing biometric characteristics on a portion of an individual's body;
comparing the biometric characteristics with stored biometric characteristics; and
on the basis of the comparison determining whether or not the individual is recognized;
the detection stage being performed by implementing the detection method of the invention, and the recognition stage being performed only if the human body portion is determined as being real at the end of the detection stage.

Thus, the recognition stage is launched only if the detection stage is successful.

Other characteristics and advantages of the invention appear on reading the following description of a particular non-limiting implementation of the invention.

BRIEF DESCRIPTION OF THE DRAWINGS

Reference is made to the sole accompanying FIGURE which is a diagram showing the system for performing the method of the invention.

DETAILED DESCRIPTION OF THE INVENTION

With reference to this FIGURE, the invention relates to a method of detecting a venous network in a portion of the human body, specifically the hand, and more particularly a finger 1 of the hand.

The method is performed by means of an automatic system comprising a detector device 10 that is itself known, comprising an infrared illuminator 11 and an infrared image sensor 12 which are arranged facing an area for positioning a user's finger 1. The positioning area is both in the beam from the infrared illuminator 11 and in the field of the infrared image sensor 12. The positioning area may be embodied by a window against which the finger 1 may be pressed and behind which the infrared illuminator 11 and the infrared image sensor 12 are mounted, or the positioning area may be embodied by guides enabling a user to place a finger 1 in the beam of the infrared illuminator 11 and in the field of the infrared image sensor 12. An infrared frequency is selected since infrared is strongly absorbed by hemoglobin and weakly absorbed by the tissue surrounding the venous network in a portion of the human body: the venous network thus shows up relative to the surrounding tissue.

The infrared illuminator 11 and the infrared image sensor 12 are connected to a computer processor unit 20 that is itself known.

The computer processor unit 20 comprises a memory 21 containing a database of biometric characteristics, a program for managing the operation of the system, a program for processing captured images in order to extract biometric characteristics therefrom, and a program for comparing the extracted biometric characteristics with the biometric characteristics from the database. In the implementation described herein, these various programs are portions of a single program arranged to perform the method of the invention.

The computer processor unit 20 also has a calculation unit 22 arranged to execute the program in question and to control the system as a whole. The computer processor unit 20 also has an input/output console enabling an operator to intervene on the system.

The method of the invention comprises the steps of:
capturing an infrared image of the finger 1 placed by the user in the capture area in order to reveal a venous network of said finger;
analyzing contrast in the infrared image in order to determine contrast characteristics of the infrared image; and
determining whether the infrared image was captured from a real finger on the basis of contrast characteristics determined in the infrared image and of contrast characteristics determined from reference fingers.

In the presently-described implementation, the method of the invention comprises a configuration stage and a detection stage.

The configuration stage comprises the steps of:
capturing infrared images of human body portions and representations of venous networks;
isolating blocks of pixels in each image and performing contrast analysis to determine for each block a directional gradient for at least two resolutions of the image;
determining average energies for the directional gradients; and
determining by training average energy thresholds for discriminating between an image of a venous network captured directly from a human body portion and an image of a venous network captured from a representation of a venous network.

It is thus necessary in this configuration stage to have representations of venous networks such as those that might be used by a dishonest person. These representations may be in the form of plane images, of images wrapped on a cylindrical support, of artificial reproductions of a human finger, . . . .

The detection stage comprises the steps of:
capturing at least one infrared image of a venous network;
isolating blocks of pixels in the image and performing contrast analysis to determine for each block a directional gradient for at least two image resolutions;

determining average energies of the directional gradients; and comparing these average energies with the thresholds in order to verify that the image of the venous network was captured directly from a human body portion.

In both stages, determining directional gradients comprises the steps of:

isolating blocks of a first number of pixels in each image and performing contrast analysis in each of the blocks in order to determine a directional gradient in each block of the first number of pixels;

isolating blocks of a second number of pixels greater than the first number of pixels in each image; and performing contrast analysis in each of the blocks in order to determine a directional gradient in each block of the second number of pixels.

All the pixels of the image are taken into account when analyzing contrast.

It can be understood that in the direction of a vein, the gradient is smaller than in a direction that is transverse to the direction of the vein. The direction of the gradient is preferably estimated by maximizing directional derivatives in four directions (with the largest amplitude of the four differentiating directions being retained).

There exist veins of different thicknesses and of varying contrasts compared with the surrounding tissues. The contrast analysis serves to conserve this information.

In an infrared image of a venous network captured from a real finger, the finger is not uniform in the sense that the image includes zones that are darker. In the center of the finger, the inter-phalange junction diffuses more in the infrared and serves to accentuate brightness, and thus accentuates contrast between these zones and the remainder of the finger. The contrast analysis serves to obtain information both concerning the pattern of the venous network and concerning the non-uniformity of the image. Performing contrast analysis with two different resolutions makes it possible to increase the amount of information obtained both about the venous network and about the non-uniformity of light diffusion in a real finger. The greater the amount of information the more reliable the discrimination between the image of a real venous network and the image of a representation of a venous network.

The second number of pixels (the number of the larger blocks) is preferably equal to the square of the first number of pixels (the number of the smaller blocks). The first number of pixels is advantageously equal to nine (well adapted to detecting high contrast veins) and the second number of pixels is advantageously equal to 81 (well adapted to detecting large veins of low contrast).

The blocks are preferably superposed so as to cover all of the images. Thus, each block is shifted by one pixel relative to its neighbors.

The directional gradients are determined in at least four directions (0°, 90°, 180°, 270°) by one of the following methods:

subtracting gray levels of the pixels; or

Sobel type filtering; or

Canny Deriche type filtering.

The simplest means for determining a directional gradient is subtracting gray levels of the pixels.

The comparison is preferably performed by initially determining vectors from the average energies of the directional gradient.

During the configuration stage, it is possible by way of example to use a training machine of the support vector machine (SVM) type in order to determine a separation surface between vectors of average energy corresponding to images of venous networks captured directly from human fingers and average energy vectors of venous network images captured from representations of venous networks. The separation surface is representative of threshold values serving to discriminate between venous network images captured directly on human fingers and venous network images captured on representations of venous networks.

During the detection stage, the mean energy vectors of the captured image are projected onto the separation surface so as to determine as a function of the sign of the projection whether the image was captured directly from a human finger or from a representation of a venous network.

Naturally, the invention is not limited to the implementations described but covers any variant coming within the ambit of the invention as defined by the claims.

In particular, directional gradients may be determined in a manner other than that described above.

The number of pixels per block may be different, and for example it may be even (it then being necessary to perform interpolation in known manner in order to determine directional gradients).

The directional gradients may be calculated at a single image resolution only.

The invention claimed is:

1. A method of detecting a venous network in a portion of a human body, the method comprising the steps of:

capturing an infrared image of said human body portion in order to reveal a venous network of said human body portion;

analyzing contrast in the infrared image in order to determine contrast characteristics of the infrared image; and determining whether the human body portion is real on the basis of contrast characteristics determined in the infrared image and of contrast characteristics determined from reference human body portions, wherein the method comprises a configuration stage and a detection stage, the configuration stage comprising the steps of:

capturing infrared images of human body portions and representations of venous networks;

isolating blocks of pixels in each image and performing contrast analysis to determine for each block a directional gradient;

determining average energies for the directional gradients; and determining by training average energy thresholds for discriminating between an image of a venous network captured directly from a human body portion and an image of a venous network captured from a representation of a venous network;

the detection stage comprising the steps of:

capturing at least one infrared image of a venous network;

isolating blocks of pixels in the image and performing contrast analysis to determine for each block a directional gradient;

determining average energies of the directional gradients; and comparing these average energies with the thresholds in order to verify that the image of the venous network was captured directly from a human body portion.

2. The method according to claim 1, wherein the directional gradients are determined for at least two image resolutions.

3. The method according to claim 1, comprising the steps of:

isolating blocks of a first number of pixels in each image and performing contrast analysis in each of the blocks in order to determine a directional gradient in each block of the first number of pixels;

isolating blocks of a second number of pixels greater than the first number of pixels in each image; and performing contrast analysis in each of the blocks in order to determine a directional gradient in each block of the second number of pixels.

4. The method according to claim 3, wherein the second number of pixels is equal to the square of the first number of pixels.

5. The method according to claim 4, wherein the first number of pixels is equal to nine.

6. The method according to claim 1, wherein the blocks are superposed so as to cover all of the images.

7. The method according to claim 1, wherein:
the vectors are determined from average energies of directional gradients;
during the configuration stage, an SVM type training machine is used for determining a separation surface for the average energy vectors of the directional gradients corresponding to images of venous networks captured directly from a human body portion and average energy vectors of directional gradients of venous network images captured on representations of venous networks; and during the detection stage, the mean energy vectors of the captured image are projected onto the separation surface so as to determine as a function of the sign of the projection whether the image was captured directly from a human body portion or from a representation of a venous network.

8. The method according to claim 1, wherein the directional gradients are determined by:
subtracting gray levels of the pixels; or
Sobel type filtering; or
Canny Deriche type filtering.

9. A biometric recognition method comprising a stage of detecting whether a human body portion is real, and a biometric recognition stage, the method comprising the following steps:
capturing biometric characteristics on a portion of an individual's body;
comparing the biometric characteristics with stored biometric characteristics; and
on the basis of the comparison determining whether or not the individual is recognized;
the detection stage being performed by implementing the method according to claim 1, and the recognition stage being performed only if the human body portion is determined as being real at the end of the detection stage.

* * * * *